UNITED STATES PATENT OFFICE.

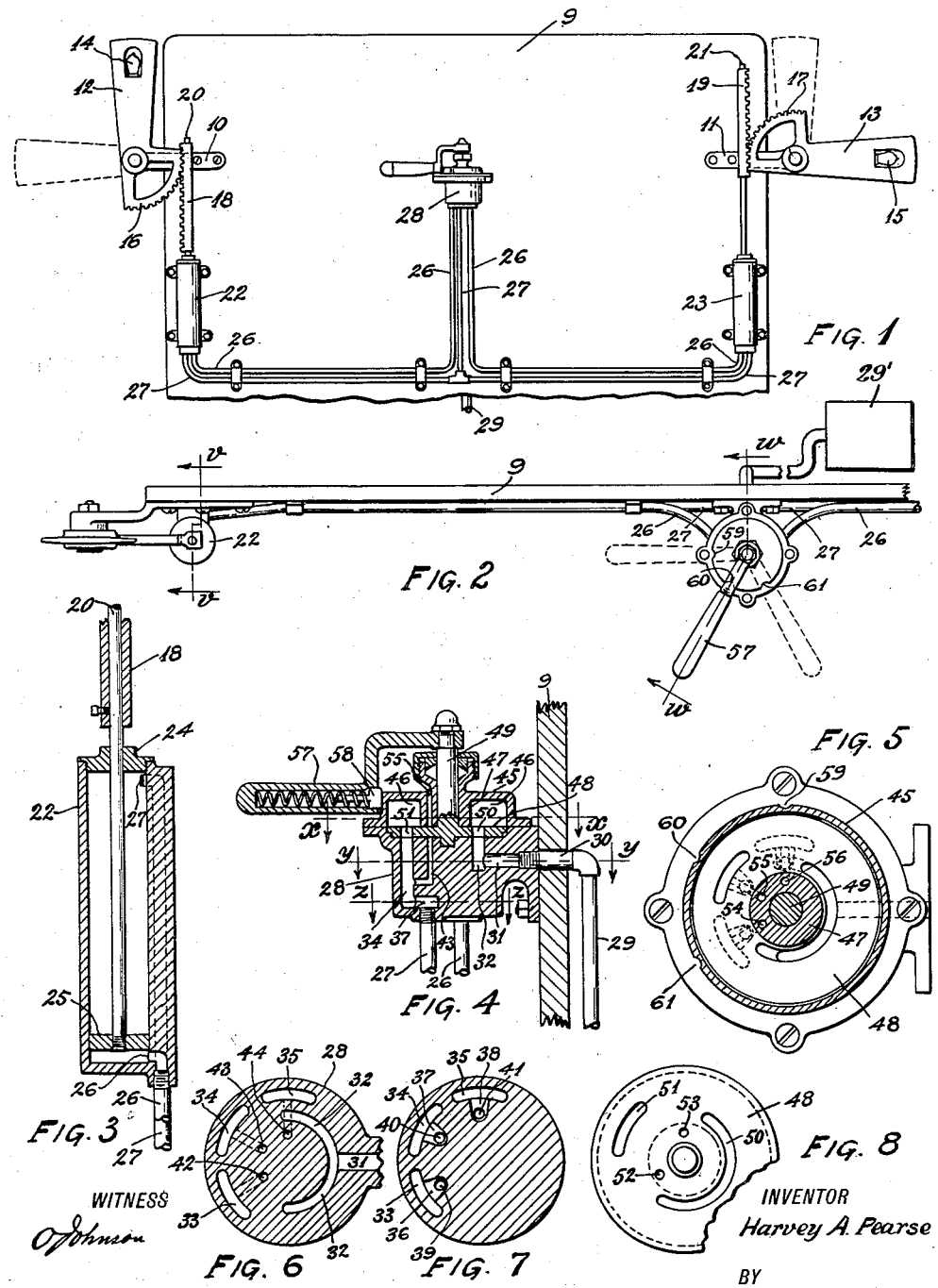

HARVEY A. PEARSE, OF SEATTLE, WASHINGTON.

SIGNALING DEVICE FOR AUTOMOBILES.

1,236,755.  Specification of Letters Patent.  Patented Aug. 14, 1917.

Application filed June 27, 1916. Serial No. 106,257.

*To all whom it may concern:*

Be it known that HARVEY A. PEARSE, citizen of the United States, residing at Seattle, in the county of King and State of Washington, has invented a certain new and useful Improvement in Signaling Devices for Automobiles, of which the following is a specification.

My invention relates to improvements in signaling devices for automobiles, and the object of my invention is to provide reliable and efficient signaling devices which may be attached to an automobile and which shall be adapted to display conspicuously a visual signal, at required times in day light or in the darkness of night, which will indicate the direction toward which the automobile is about to be turned in its course of travel.

I accomplish this object by devices illustrated in the accompanying drawings wherein Figure 1 is a view in front elevation of operative mechanism embodying my invention as it appears when associated with the dash-board of an automobile; Fig. 2 is a fragmentary plan view of the same on an enlarged scale; Fig. 3 is a view on a larger scale in vertical section on broken line $v$, $v$ of Fig. 2, showing parts of the same; Fig. 4 is a view in vertical section on broken line $w$, $w$ of Fig. 2, showing other parts of the same; Fig. 5 is a view on a still larger scale in horizontal section on broken line $x$, $x$ of Fig. 4, showing parts of the same; Fig. 6 is a view in horizontal section on broken line $y$, $y$ of Fig. 4 of a part of the same; Fig. 7 is a view in horizontal section on broken line $z$, $z$ of Fig. 4; and Fig. 8 is a plan view of a part of the same.

Referring to the drawings, throughout which like reference numerals designate like parts, 9 represents the dash-board of an automobile, and to each of the opposite end portions of said dash-board 9 is secured a bracket (as brackets 10 and 11) to the outwardly projecting end of which is pivotally attached a signal arm (as signal arms 12 and 13 respectively) which is provided with an incandescent electric lamp disposed in its outer end portion (as lamps 14 and 15 respectively).

The pivoted end portion of each of the signal arms 12 and 13 is provided with an integral quadrant of a gearwheel (as quadrants 16 and 17 respectively) whose teeth are disposed to be in operative engagement with a vertically slidable toothed rack (as racks 18 and 19 respectively) so that vertical movements of said rack may cause its associated signal arm swingingly to move between its normal vertical position and a horizontal position; as, for instance, as shown in Fig. 1, when the rack 18 was moved downwardly from its uppermost position to its position shown, then the arm 12 was swung from the horizontal position indicated by dotted lines to the vertical position as shown by full lines, and when the rack 19 was raised from its lowermost position to its position shown, then the arm 13 was swung downwardly from the vertical position indicated by dotted lines to the horizontal positions shown by full lines, in which horizontal position the arm 13 indicates that the automobile is about to turn toward the right hand in the course of its travel.

The racks 18 and 19 are attached to the upper end portions of the piston rods 20 and 21, respectively, which project upwardly out of cylinders 22 and 23, respectively, as shown in Fig. 1.

The construction and mode of operation of both piston rods 20 and 21 and their associated cylinders 22 and 23 are alike and will be understood by referring to Fig. 3, wherein the cylinder 22 is provided with a removable cylinder head 24 through which the piston rod 20 projects outwardly to support the rack 18, and the inner end of said piston rod 20 is provided with a piston 25 which is adapted to be actuated in an obvious manner to make vertical movements by air, under pressure, that is admitted at different times into each of the opposite end portions of the cylinder 22 through pipes 26 and 27; thus, if air be permitted to escape from the pipe 27 at the same time that air is forced into the bottom end of the cylinder 22 through the pipe 26, then the piston rod 20 will be raised to cause the rack 18 to actuate the quadrant 16 to cause the arm 12 to swing downwardly to a horizontal position; but, if air be permitted to escape from the pipe 26 and at the same time air be forced through the pipe 27 into the upper end of said cylinder 22, then the piston rod 20 will be forced downwardly to cause the rack 18 to raise the arm 12 to its vertical position.

In order to control the introduction of compressed air to the cylinder 22 at proper times through the pipes 26 and 27 such pipes 26 and 27 are extended from the lower end of said cylinder 22 to a hand operated controller 28 that is secured to the central portion of the dash-board 9, as indicated in Fig. 1, which controller 28 is connected by a pipe 29, as shown more clearly in Fig. 4, with a source of compressed air, as, for instance, an air tank 29' carried by the automobile.

As shown in Fig. 4, the pipe 29 is connected to a nipple 30 which extends through the dash-board 9 to connect with a passageway 31 that leads to a semi-circular chamber 32 in the body portion of the controller 28, said body portion being further provided with three other deeper chambers 33, 34 and 35, each of the form of a segment of a circle, as shown more clearly in Fig. 6, all of said chambers 32, 33, 34 and 35 projecting downwardly from the flat top surface of said body portion in positions concentric with the circular exterior form of said body portion of said controller 28.

At the bottom of each of the chambers 33, 34 and 35 is provided a passageway, as passageways 36, 37 and 38 which, as shown in Fig. 7, extend in radial lines toward the center of the body portion to connect with holes 39, 40 and 41, that extend downwardly through the bottom of said body portion to connect with the pipes 26 and 27.

The chamber 34 is connected through the hole 40 with the pipe 27 which extends in branches to both of the cylinders 22 and 23, while the chamber 33 is connected through the hole 39 with that one of the pipes 26 which leads to the cylinder 23, and the chamber 35 connects through the hole 41 with the other one of the pipes 26 which leads to the cylinder 22.

Each of the chambers 33, 34 and 35 is provided with another passageway, as passageways 42, 43 and 44, which extend inwardly and upwardly to the top surface of the body portion of the controller 28, the positions of which passageways 42, 43 and 44 are more clearly shown in Fig. 6.

Disposed on the top of the body portion of the controller 28 is a flanged cover 45 which is provided with an annular channel 46 and a hub 47 and disposed between the bottom end of the hub 47 and the top surface of the body portion of the controller 28 is disk-like valve 48 which is provided with an integral valve-stem 49 that is disposed to extend upwardly through and out of the hub 47, as more clearly shown in Fig. 4.

The disk-like valve 48 is provided with a concentrically disposed semi-circular slotted opening 50 that is adapted to register with the chamber 32 in response to a rotative movement of said disk-like valve 48 and such valve 48 is further provided with another slotted opening 51, of segmental form, which is adapted to register with any one of the chambers 33, 34 and 35 in response to such rotative movement.

The disk-like valve 48 is also provided with two holes 52 and 53 extending through it, as shown more clearly in Fig. 8, which holes 52 and 53 are disposed to register with the passageways 42 and 44 when the slotted opening 51 registers with the chamber 34.

Extending vertically through the hub 47 are three holes 54, 55 and 56 which are disposed to register with the passageways 42, 43 and 44.

Upon the top end of the valve-stem 49 is rigidly attached a hand lever 57 which is provided with a hollow handle and with a spring actuated plunger 58 which is adapted to engage with notches 59, 60 and 61 formed in the periphery of the cover 45 by which notches the hand lever 57 may be detained in a desired position to cause the valve 48 to be locked in a desired one of its different operative positions.

For, instance, normally to maintain the signal arms 12 and 13 both in vertical positions, the hand lever 57 is disposed as shown in Fig. 2 to register with the notch 60 thus to cause compressed air from the supply pipe 29 to flow through the chamber 32 through the slotted opening 50 into the channel 46, thence through the slotted opening 51 into the chamber 34, thence through the passageway 37 and the hole 40 into the pipe 27 which is branched to the cylinders 22 and 23 thereby to conduct such compressed air into the top ends of said cylinders 22 and 23 to depress the piston rods 20 and 21 to cause the racks 18 and 19 to swing upwardly the arms 12 and 13 to vertical positions there to be maintained so long as the hand lever 57 registers with said notch 60.

If it be desired to indicate that the automobile is about to turn toward the left hand in the course of its travel then the hand lever 57 is swingingly moved to register with the notch 59 whereupon the disk-like valve 48 will be disposed to permit the passage of compressed air from the supply pipe 29 through the chamber 32 and slotted opening 50 into the channel 46, thence through the slotted opening 51 into the chamber 35, thence through the passageway 38 and hole 41 into that one of the pipes 26 which leads to the bottom end of the cylinder 22, and at the same time air is permitted to escape from the top end of the cylinder 22 through the pipe 27 and passageway 34 and thence through the passageway 43 upwardly through the hole 52 in the disk-valve 48 and through the hole 55 that extends upwardly through the hub 47 thereby to relieve the pressure above the piston 25 which will then be raised by the compressed air that enters the bottom end of the cylinder 22 through the pipe 26, and in an obvious manner the rack 18, as it rises, will cause the signal arm 12 to swing downwardly to a horizontal position to indicate that the automobile is about to turn toward the left hand.

In order to indicate that the automobile is about to turn toward the right hand, the hand lever 57 is moved to a position registering with the notch 61 which will cause the slotted opening 51 of the valve 48 to register with the chamber 33 and will cause the hole 53 of said valve 48 to register with the hole 55 in the hub 47 and with the passageway 43 that leads into the chamber 34 whereby in an obvious manner air may escape from the top end of the cylinder 23 and at the same time compressed air will be permitted to enter the end of said cylinder 23, thus to raise the rack 19 to actuate the signal arm 13 and cause it to swing downwardly to a horizontal position as shown by full lines in Fig. 1.

The incandescent electric lamps 14 and 15 may be each provided with an automatic switch of a well known form, whereby it may be lighted whenever the signal arm to which it is attached reaches a horizontal position, and whereby it will be extinguished upon being raised from said horizontal position.

Manifestly, changes may be made in the forms, dimensions and arrangement of parts of my invention without departing from the spirit thereof.

What I claim is:

1. A signal for vehicles comprising cylinders arranged at opposite sides of a vehicle, pistons arranged to operate within such cylinders, signal arms operatively connected with said pistons, means for supplying motive fluid to said cylinders for projecting and retracting said pistons, and a valve for controlling the supply of motive fluid to said cylinders whereby any desired one of said pistons may be projected or retracted.

2. A signal for vehicles comprising cylinders vertically arranged at opposite sides of a vehicle, pistons arranged to operate within such cylinders, pivoted signal arms adjacent said cylinders and operatively connected with said pistons, means for supplying motive fluid to said cylinders for projecting and retracting said pistons, and a valve for controlling the supply of motive fluid to said cylinders whereby any desired one of said pistons may be projected or retracted.

In witness whereof I hereunto subscribe my name this 20th day of June, A. D., 1916.

HARVEY A. PEARSE.

Witnesses:
FRANK WARREN,
O. JOHNSON.